United States Patent [19]

Smith

[11] 3,905,637
[45] Sept. 16, 1975

[54] ATTACHMENT FOR VEHICLE LICENSE PLATE HOLDER

[75] Inventor: Ennis Dean Smith, Claremore, Okla.

[73] Assignee: Kain's Research and Development Company, Inc., Bartlesville, Okla.

[22] Filed: Oct. 1, 1973

[21] Appl. No.: 402,386

[52] U.S. Cl. .............................. 296/1 C; 217/60 B
[51] Int. Cl. ............................................ B62d 25/00
[58] Field of Search ......... 296/1 C; 217/60 R, 60 B, 217/61; 16/138; 292/338

[56] References Cited
UNITED STATES PATENTS

| | | | |
|---|---|---|---|
| 1,657,837 | 1/1928 | Murphy | 16/138 |
| 2,760,811 | 8/1956 | Basferd | 296/1 C |
| 3,131,000 | 4/1964 | Pierce | 296/1 C |
| 3,225,856 | 12/1965 | Caramanna | 217/60 B |
| 3,287,050 | 11/1966 | Ferrante | 292/338 |

Primary Examiner—Richard A. Schacher
Assistant Examiner—Robert Saifer

[57] ABSTRACT

An attachment adapted to be mounted on the rear surface of a vehicle license plate holder for vehicles having the gas tank opening mounted behind the license plate. The attachment comprises a mounting plate having a finger pivotally secured thereto, said finger engagable with the vehicle body in the lowered position of the license plate holder during times of accessibility of the gas tank, and movable to an out-of-the-way position for precluding interference with the plate holder during restoring thereof to the normal upper position thereof.

2 Claims, 3 Drawing Figures

Fig.1

ATTACHMENT FOR VEHICLE LICENSE PLATE HOLDER

BACKGROUND OF THE INVENTION

1. Field of the Invention

This invention relates to improvements in vehicle license plate holders and more particularly, but not by way of limitation, to an attachment for facilitating retaining of the license plate holder in a lowered position during times of access to the gas tank mounted behind the license plate.

2. Description of the Prior Art

Many vehicles in use today are provided with gasoline tank access ports mounted in the rear of the vehicle behind the usual license plate. The license plate holder on vehicles of this type is usually secured to the vehicle body by a spring type pivot hinge whereby the license plate holder may be moved away from the vehicle body and to a lowered position with respect thereto for providing access to the gasoline tank opening. The spring-hinge constantly urges the license plate holder upwardly toward a position substantially adjacent the vehicle body, and as a result the service station attendant or operator must use one hand to hold the license plate holder in its lowered position, while he manipulates the gas cap and supply hose with his other hand. The inconvenience of such an arrangement will be apparent.

SUMMARY OF THE INVENTION

The present invention contemplates a novel attachment for license plate holders particularly designed and constructed for overcoming the above disadvantages. The novel attachment is adapted to be secured to the rear surface of the license plate holder, and is operable for retaining the license plate in the lowered position thereof to free both hands of the service station attendant, or other person requiring access to the gasoline tank opening. The novel attachment comprises a support plate adapted to be secured to the license plate holder. A finger is carried by the support plate which is movable to a first position away from engagement with the vehicle body for precluding interference with the normal upper position for the license plate holder, and movable to a second position for engaging the vehicle body to retain the license plate in the lowered position therefor during the period required for the accessibility to the gasoline tank, or the gas cap. Of course, when the license plate holder is to be returned to the normal upper position thereof, the finger may be moved from said second position to said first position whereby the normal or usual spring-hinge of the license plate holder may freely return the license plate holder to the normal upper position therefor. The novel attachment is simple and efficient in operation and economical and durable in construction.

DESCRIPTION OF THE PREFERRED EMBODIMENT

Figure 2:
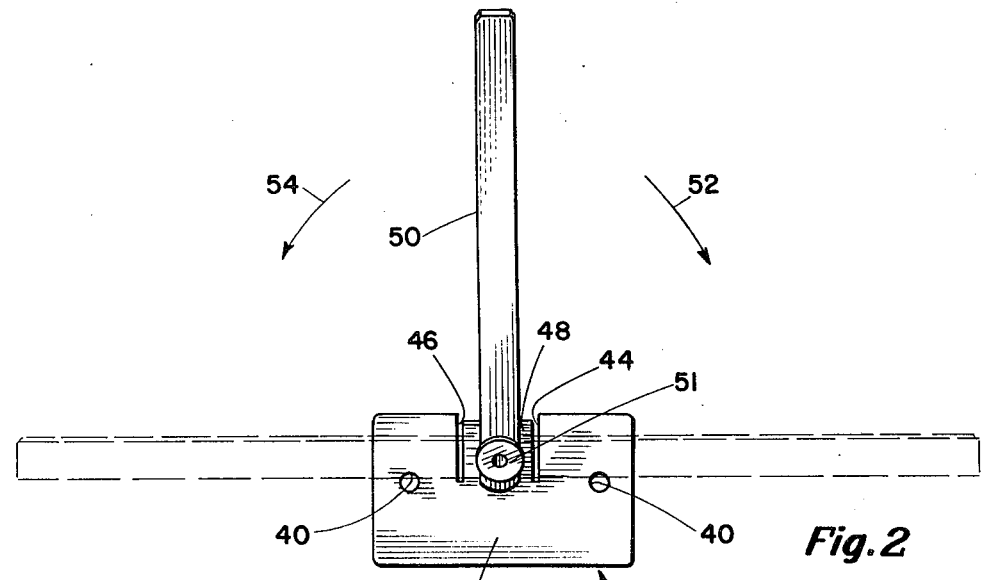
FIG. 2 is a plan view of an attachment embodying the invention, with alternate positions therefor depicted in broken lines.

Referring to the drawings in detail, reference character 10 generally indicates the rear portion of a vehicle having an opening 12 provided therein for access to the gas cap 14 of the usual gasoline tank (not shown). A license plate holder 16 is mounted or installed on the rear portion 10 of the vehicle in the proximitty of the opening 12 in any suitable or well known manner. As shown herein the license plate holder 16 is provided with a pair of spaced substantially axially aligned sleeves 18 and 20 on the rear surface 21 thereof for disposition in alignment with sleeves 22 and 24, respectively, provided on a hinge plate 26, as is well known. A pivot shaft 28 extends through the sleeves 18, 20, 22 and 24, and suitable spring means 30 and 32 are disposed around the shaft 28 and anchored between the plate 26 and holder 16 in any suitable manner for constantly urging the plate 16 in an upward direction toward a position substantially adjacent the rear 10 of the vehicle for normally covering the opening 12. In addition, a plurality of stop members 34 are usually provided on the rear 10 of the vehicle in the proximity of the opening 12 for receiving the license plate holder 16 thereagainst in the normal upper position thereof (not shown).

Figure 1:
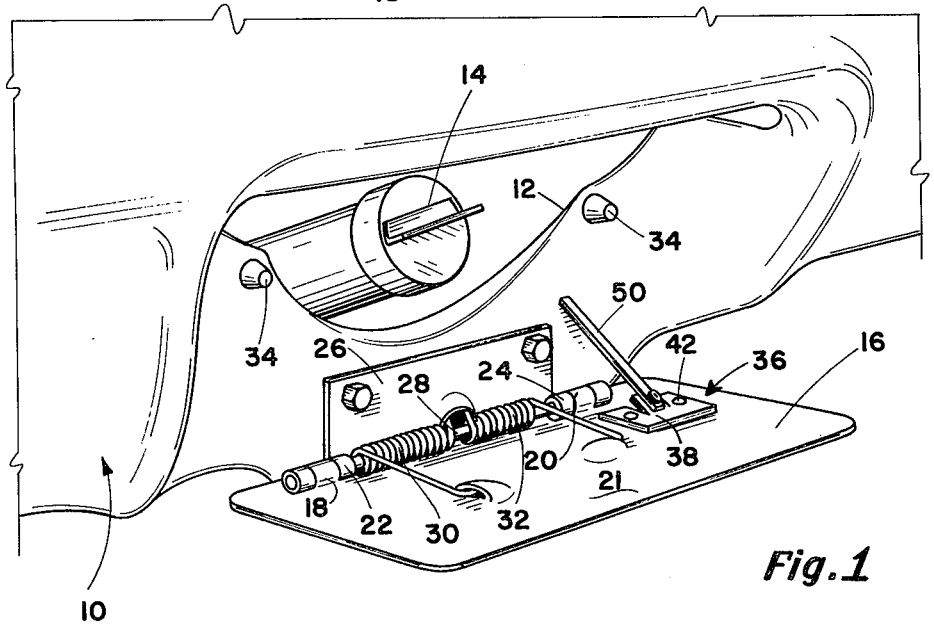
FIG. 1 is a prespective view of a license plate holder having an attachment embodying the invention provided thereon, and depicted in the lowered position thereof permitting access to the gaoline tank gas cap.

An attachment device generally indicated at 36 is secured to the rear surface 21 of the holder 16 for retaining the holder 16 in the lowered position thereof as shown in FIG. 1 in a manner as will be hereinafter set forth. The attachment 36 comprises a mounting plate 38 having a plurality of spaced apertures 40 provided therein for receiving suitable screws 42, or the like, therethrough for securing the plate 38 to the holder 16. A pair of spaced slits 44 and 46 are provided on one edge of the plate 38 and extend perpendicularly therefrom slightly less than one half the width of the plate 38, but not limited thereto.

Figure 3:
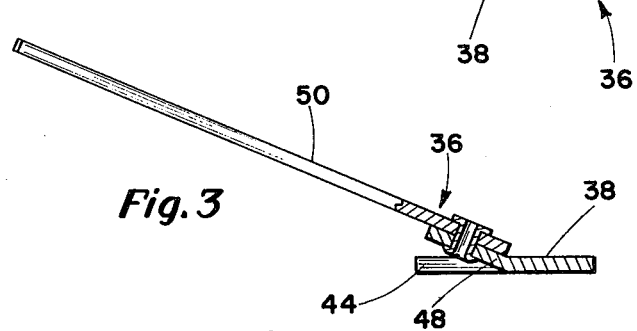
FIG. 3. is a side elevational view of an attachment embodying the invention, with portions thereof depicted in section for purposes of illustration.

A tab member 48 is formed between the slits 44 and 46, and extends angularly from the plane of the plate 38 in a direction away from the holder 16, as particularly shown in FIGS. 1 and 3. A finger 50 is pivotally secured to the tab 48 in any suitable manner, such as by a rivet 51, and is movable in a plane substantially parallel to the plane of the tab 42, and in either a clockwise or counter clockwise direction as indicated by the arrows 52 and 54 in FIG. 2. The rotational or pivotal movement of the finger 50 in either direction is limited by the engagement thereof with the plate 38, and the outer limit of the rotationaly movement of the finger 50 is a position substantially parallel to the plane of the holder 16, and as indicated by broken lines in FIG. 2.

Of course, it will be apparent that the finger 50 may be spring loaded in any suitable manner (not shown) for constantly urging of the finger 50 in the outwardly extending position thereof shown in solid lines in FIGS. 1 and 2, if desired. In addition, the finger 50 may be provided with suitable longitudinally spaced transversely extending identations or scorings (not shown), if desired, in order that the finger 50 may be readily "snapped" off at a selected indentation for adjusting the overall length of the finger 50 as most desirable for the particular installation of the attachment 10.

In operation, the finger 50 is normally disposed in a position thereof adjacent the rear surface 21 of the holder 16, and the holder 16 is normally disposed in an upper position against or in the proximity of the rear portion 10 of the vehicle for covering the opening 12. As hereinbefore set forth, the spring means 30 and 32 constantly urges the plate holder 16 toward the upper position thereof for maintaining the holder 16 in the normal position therefor.

When it is desirable or necessary to provide access to the gas cap 14, the holder 16 may be manually pivoted against the force of the spring means 30 and 32 to position the holder 16 in the lowered position thereof as shown in FIG. 1. The finger 50 may be manually pivoted about the rivet 51 to the extended position thereof as shown in FIG. 1, and in solid lines in FIG. 2, whereby the outer end of the finger 50 will engage the rear portion 10 of the vehicle for securely retaining the holder 16 in the lowered position therefor until it is no longer necessary to provide access to the gas cap 14.

When the holder 16 is to be returned to the normal position thereof, the finger 50 may be manually pivoted about the rivet 51 into a position adjacent the rear surface 21 of the holder 16, and the spring means 30 and 32 will promptly raise the holder 16 to the normal position thereof.

Of course, if the finger 50 is spring loaded for constant urging in a direction toward the extended position thereof, the finger 50 will automatically pivot into a position for engaging the rear 10 of the vehicle as the holder 16 is moved downwardly against the force of the spring means 30 and 32. In this event, it may be necessary to manually pivot the finger 50 against the force of the spring loading means in order to return the holder 16 to the normal upper or raised position therefor.

From the foregoing it will be apparent that the present invention provides a novel attachment for the license plate holder of a vehicle having the gas tank access port located behind the vehicle license plate, said attachment being particularly designed and constructed for efficiently retaining the holder in a lowered position during periods of access to the gas tank access port and in an out-of-the-way position for precluding interference with the normal raised position of the holder.

Whereas the present invention has been described in particular relation to the drawings attached hereto, it should be understood that other and further modifications, apart from those shown or suggested herein, may be made within the spirit and scope of this invention.

What is claimed is:

1. In combination with a license plate holder hingedly secured to a vehicle and having alternate raised and lowered positions, an attachment comprising a mounting plate removably secured to the surface of the holder directed toward the vehicle in the raised position of the holder; said mounting plate being provided with spaced slits extending transversely substantially half the width thereof, a tab member formed between the slits and angularly disposed with respect to the plane of the mounting plate, a finger member having one end pivotally secured to the tab member and pivotal in a plane substantially parallel to the plane of the tab member to provide alternate extended and retracted positions for the finger member, said finger member being engagable with the vehicle in said extended position thereof for intermittently retaining the holder in said lowered position.

2. For use with a license plate holder hingedly secured to the vehicle and having alternate raised and lowered positions, an attachment comprising a plate member secured to the inside surface of the holder, an elongated finger means pivotally secured to the plate member, the pivotal axis thereof being at an angle substantially less than 90° with respect to the holder and said pivotal axis also lying in a plane which is perpendicular to the axis of the holder hinge, said finger means being movable between an extended position where the finger is disposed at an acute angle with respect to the holder for engaging the vehicle when the holder is in the lower position and a retracted position whereby the finger means is disposed substantially parallel to the holder when said holder is in its raised position.

* * * * *